United States Patent [19]
Stone, III

[11] Patent Number: 5,857,483
[45] Date of Patent: Jan. 12, 1999

[54] PLASTIC FLOAT VALVE

[76] Inventor: Harley E. Stone, III, P.O. Box 7184, Jacksonville, Fla. 32216

[21] Appl. No.: 769,960

[22] Filed: Dec. 19, 1996

[51] Int. Cl.$^6$ .................................................. F16K 31/26
[52] U.S. Cl. ........................... 137/443; 137/444; 137/446
[58] Field of Search ..................... 137/434, 442, 137/443, 444, 446

[56] References Cited

U.S. PATENT DOCUMENTS

| | | | |
|---|---|---|---|
| 164,539 | 6/1875 | Fuller | 137/442 |
| 178,656 | 6/1876 | Meyer | 137/442 |
| 1,266,637 | 5/1918 | Snyder | 137/445 |
| 1,302,538 | 5/1919 | Gulick | 137/444 |
| 1,612,857 | 1/1927 | Donnelly | 137/443 |
| 1,678,769 | 7/1928 | Delany | 137/444 |
| 1,826,322 | 10/1931 | Mueller | 137/445 |
| 2,164,927 | 7/1939 | Kohler | 137/444 |
| 2,214,863 | 9/1940 | Schultheiss | 137/445 |
| 2,520,573 | 8/1950 | Smith et al. | 137/444 |
| 2,595,937 | 5/1952 | Graham | 137/444 |
| 2,715,415 | 8/1955 | Tucker | 137/442 |
| 2,730,121 | 1/1956 | Hansen | 137/444 |
| 2,730,122 | 1/1956 | Svirsky | 137/442 |
| 4,762,142 | 8/1988 | Tams | 137/442 |

FOREIGN PATENT DOCUMENTS

| | | | |
|---|---|---|---|
| 768447 | 10/1967 | Canada | 137/443 |
| 1479163 | 2/1966 | France | 137/443 |
| 58247 | 9/1935 | Norway | 137/443 |

*Primary Examiner*—George L. Walton
*Attorney, Agent, or Firm*—Thomas C. Saitta

[57] ABSTRACT

A plastic float valve wherein the piston is provided with a number of thin ridges as bearing surfaces which contact the valve bore, an annular cup seal to seal the valve bore and a tip washer having a truncated cone portion and mounted onto a tapered post on the piston, where the piston seals an inlet orifice by pressing the tip washer against an annular rim which is surrounded by a recessed channel.

7 Claims, 3 Drawing Sheets

PLASTIC FLOAT VALVE

BACKGROUND OF THE INVENTION

This invention relates generally to the field of float valves—valves which control the flow of water through a system in response to the movement of a float device in a reservoir of water with changing surface level. More particularly, the invention relates to such valves which are composed of a plastic or polymeric material.

Float valves are well known devices used to control water flow and are commonly used to refill water tanks to a desired level when water in the tank has been removed. Typical devices which contain float valves are toilets, water storage tanks, water aerator tanks, etc. The vast majority of such valves, because water flows through the device and because they are often found in wet environments, are made of metal—most commonly brass or stainless steel. A problem with the brass metal valves is that they easily corrode and trap mineral deposits, which means that the valves must be replaced on a regular basis. The stainless steel valves are less subject to corrosion and depositing, but are relatively high in cost. Plastic valves offer a solution to the problems of corrosion and deposit while maintaining a relatively low cost of manufacture, but suffer from several problems in the embodiments currently known in that the force applying components are subject to failure, the plastic valves are suitable only for low volume flow rates because of size limitations to the inlet orifice and the use of O-rings to seal the gap between the piston and the housing. The O-rings make movement of the piston difficult and the valve is very susceptible to jamming. The O-rings are also relatively easily unseated in high pressure applications. Even with the small inlet orifice size, the plastic valves heretofore known do not seal well after repeated uses. Another problem encountered in both metal and plastic valves is that the tip washer, which is shaped as a truncated cone and seats against the inlet orifice of the valve to seal off the inlet conduit, is mounted within a recess formed by an annular collar or rim on the end of the piston. The presence of this collar or rim blocks or limits water flow around the tip washer, producing a reduced flow rate.

It is an object of this invention to provide a float valve constructed of plastic which is relatively low in cost, does not readily corrode, does not allow excessive mineral deposits to build up on the internal surfaces, does not easily jam, is strong, is able to handle large volume flow rates, operates smoothly and easily, and retains the ability to totally seal the flow conduit over long term use.

SUMMARY OF THE INVENTION

The invention is a float valve composed of a plastic material which operates to control the flow of water comprising an inlet conduit adapted for connection to a water source conduit, an inlet orifice smaller in diameter than the diameter of the inlet conduit, and an outlet conduit adapted for connection to a water delivery conduit, the outlet conduit typically positioned at a right angle to the inlet conduit. A piston moveable along its longitudinal axis is slidingly mounted within a valve bore, the piston being operated by a pivoting lever mounted to the valve body and attached on one end to the external end of the piston and on the other end to an adjustable arm connected to a float. A number of longitudinal bearing surfaces, consisting of raised ridges, are located on the piston body to restrict non-axial movement of the piston within the bore and to reduce the contact surface area between the piston body and valve bore. An annular cup seal made of a polymeric or elastomeric material is mounted within an annular recess on the piston body to prevent water from leaking out through the valve bore. The internal end of the piston is flat and is provided with an axially oriented washer mounting post having a free end and a connected end, the mounting post decreasing in cross-sectional dimension over the majority of its length from the free end toward the connected end. A tip washer made of a polymeric or elastomeric material having an axial aperture slightly smaller in diameter than the diameter of the mounting post at its widest point is forced onto the mounting post, where it is retained by friction. The tip washer is cylindrical on the end facing the flat internal piston end and is of a truncated cone shape on the end facing the inlet orifice. The seat of the inlet orifice is configured to have a raised annular rim or lip which abuts the chamfered surface of the tip washer when the piston is advanced internally within the bore, creating a 360 degree line or ring of contact which stops the flow of water through the inlet orifice until the piston is withdrawn. Surrounding the annular rim is a recessed channel which provides an area of unimpeded flow such that less force is required to completely seal the valve.

DETAILED DESCRIPTION OF THE INVENTION

The invention will now be described in with regard for the best mode and preferred embodiment, with reference to the drawings for illustration of particular elements and components. In general, the invention is a float valve for use in controlling water flow through conduits in which the valve is mounted, the valve being responsive to changes in water level in a water tank, such that removal of water from the tank opens the valve to refill the tank. When the tank has been refilled to the desired level, the valve closes and stops water flow. The major structural components of the valve are formed of a hard, chemically resistant plastic, such as PVC.

Figure 1:
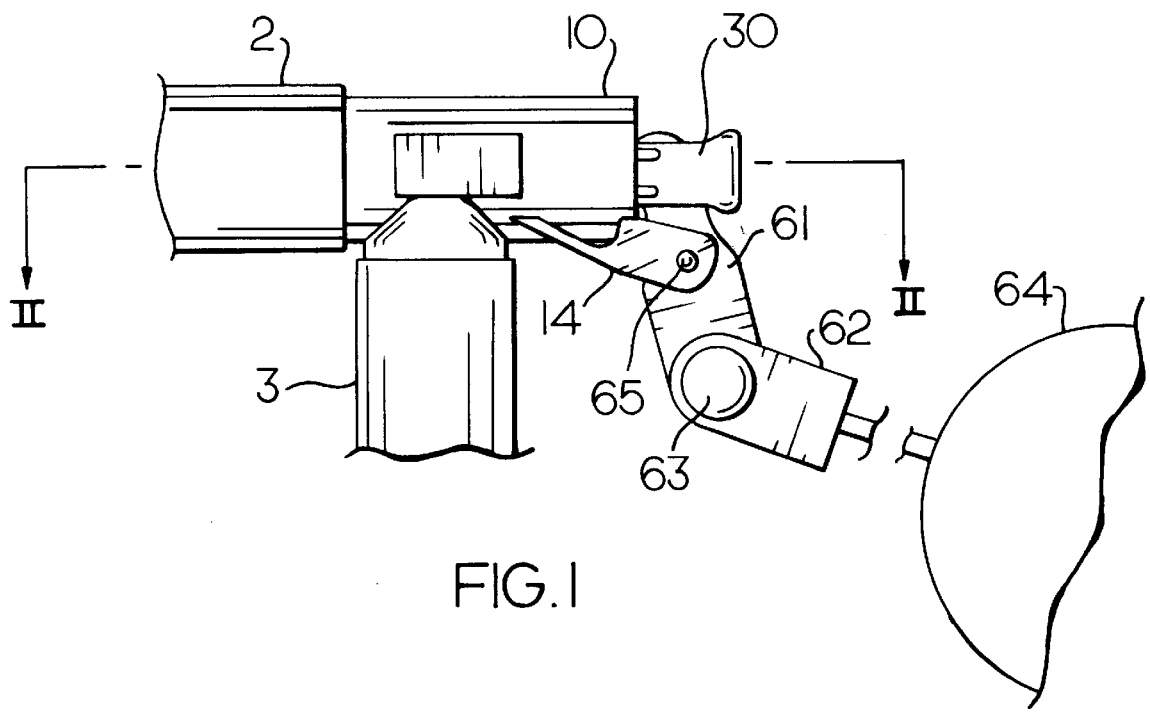
FIG. 1 is a side view of the invention.

Referring now to FIG. 1, the major components of the float valve are illustrated. The invention comprises in general a float valve body 10 which is connected to a water source conduit 2 and a water delivery conduit 3 by a threaded or mechanical joining, such that water or any other liquid flows from the water source conduit 2, through the valve body 10 and out the water delivery conduit 3. The float valve reciprocates from a closed to an open and back to a closed position in use. The valve body 10 has a main longitudinal axis 1 which is preferably in alignment with the axis of the water source conduit 2, while the water delivery conduit 3 is aligned at an angle, preferably 90 degrees, to the longitudinal axis 1. A piston 30 is slidingly mounted within valve body 10 such that it may move in the longitudinal direction to open and close the float valve. The piston 30 is operated by a pivoting lever 61 connected by pin 65 to a lever mount 14 on valve body 10. The exposed end 31 of the lever 61 is connected to an adjustable arm 62 which is connected to a float member 64. The float member 64 floats on the water in the water tank and a change in water level causes the lever 61 to pivot, thereby moving the piston 30 along the longitudinal axis 1 to either open or close the valve. This overall construction and operational mechanism for a float valve is well known in the art.

Referring now to the remaining figures, the inventive elements and operational aspects of the float valve are more clearly illustrated. The interior of the valve body 10 provides a controlled fluid passageway for liquid from the water source conduit 2 to the water delivery conduit 3 which is comprised of inlet conduit 11, inlet orifice 21 and outlet conduit 12. Inlet conduit 11 is in fluid communication with water source conduit 2 and outlet conduit is in fluid communication with water delivery conduit 3, and both consist of relatively large diameter bores within valve body 10. Outlet conduit 12 is preferably positioned perpendicular to inlet conduit 11, although other angles are possible. The valve body 10 also comprises a cylindrical valve bore 13 which receives piston 30. Valve bore 13 is preferably in parallel to inlet conduit 11, and most preferably valve bore 13 and inlet conduit 11 are co-axially aligned on a common longitudinal axis 1.

Piston 30 is generally cylindrical in configuration and is comprised of a piston main body 34, an internal end 32, preferably flat, which is positioned inside the valve body 10, and an external end 31, which is positioned outside of the valve body 10. In the embodiment shown, the end of the actuating lever 61 is positioned within a slot 38 cut into the main body 34, the slot 38 creating abutting surfaces such that the piston 30 will move along the longitudinal axis 1 in both directions in response to the lever 61 pivoting relative to lever mount 14. Other means to operationally connect the lever 61 to the piston 30 are well known in the art, such as by mechanically joining the two elements in a hinged manner. Also, the external end 31 of the piston 30 as shown does not need to fully extend from the valve body 10, as it is possible to provide an elongated body 10 with a slot to receive lever 61.

Figure 4:
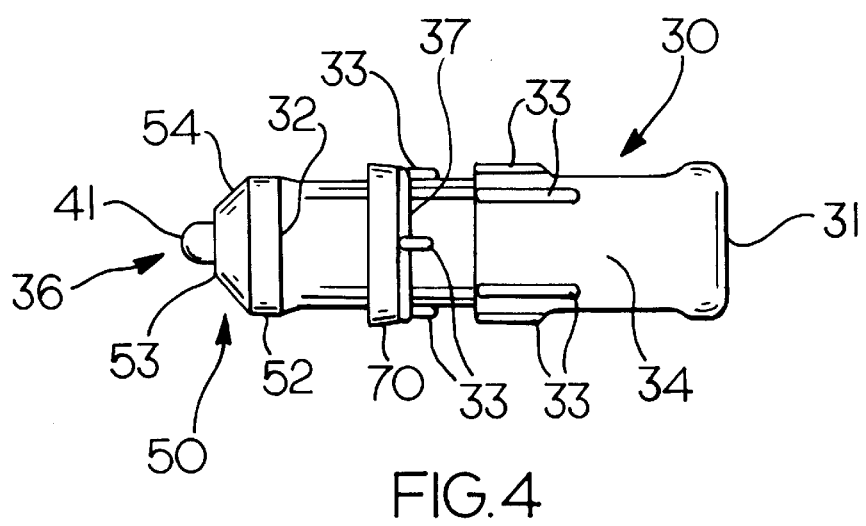
FIG. 4 is a view of the piston, shown removed from the valve body.
Figure 2:
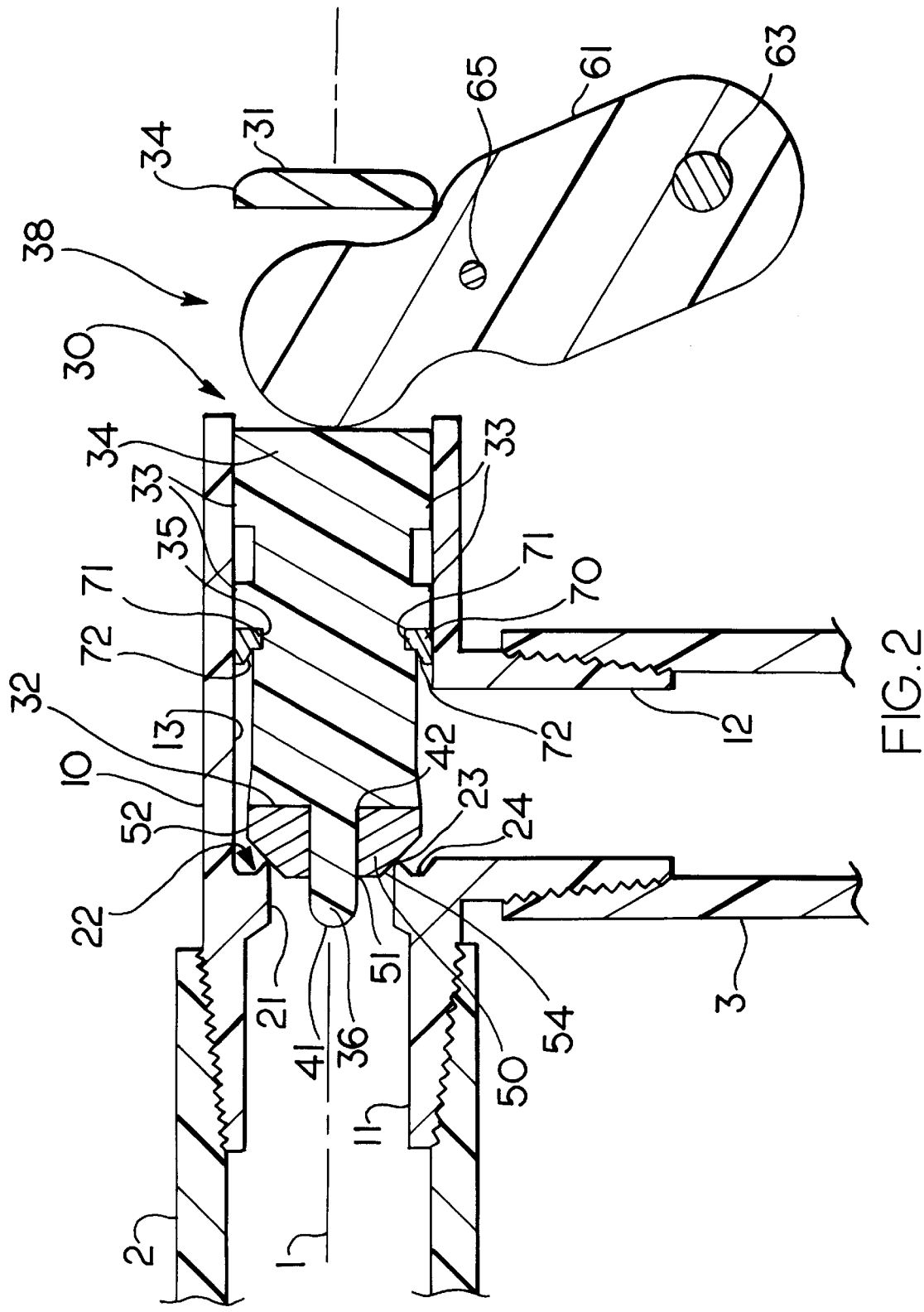
FIG. 2 is a cross-sectional view of the invention in the closed position, taken along line II—II of FIG. 1.
Figure 3:
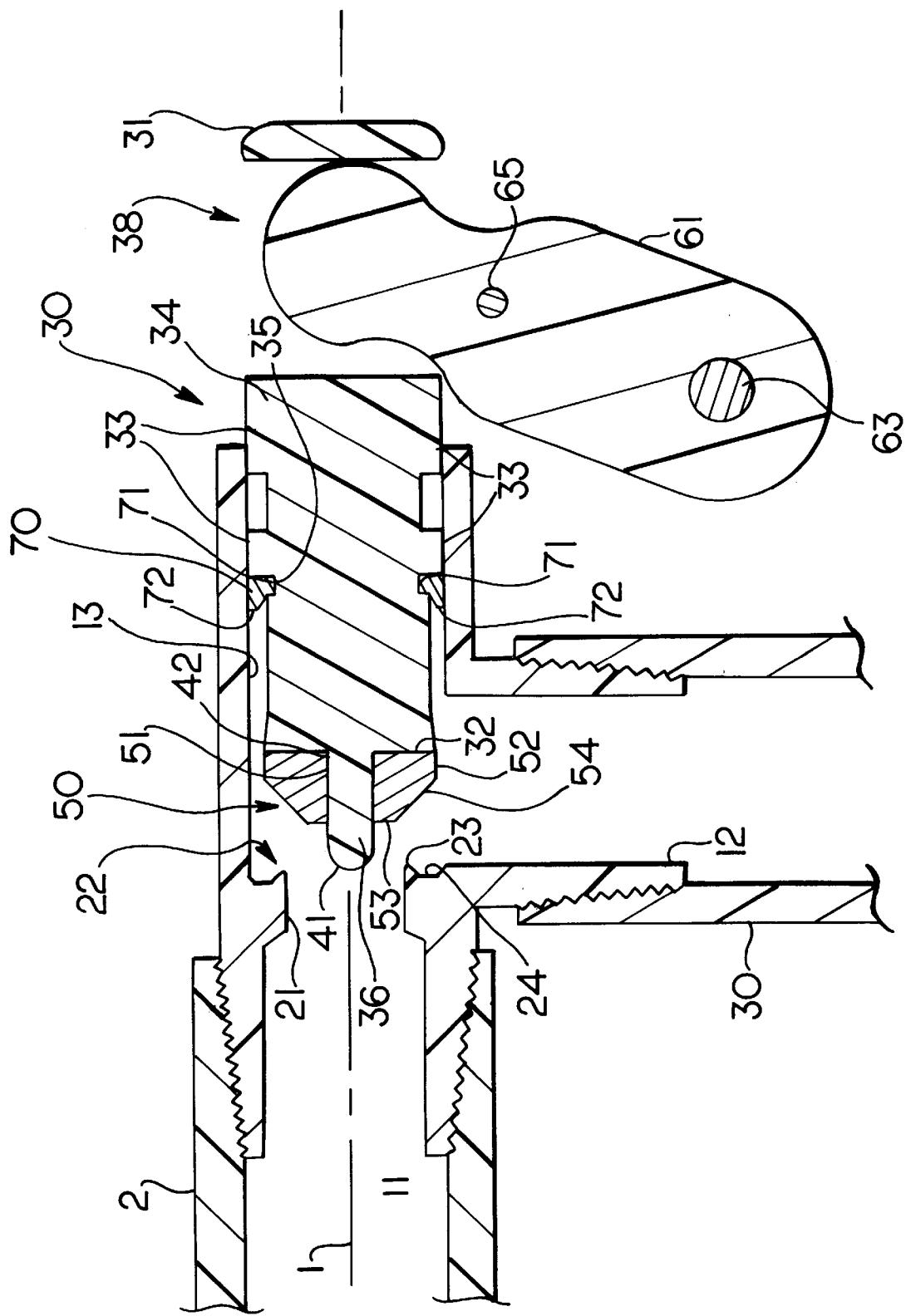
FIG. 3 is a cross-sectional view of the invention in the open position.

The external diameter of the main piston body 34 is sized to be smaller than the internal diameter of the valve bore 13. The piston body 34 is provided with longitudinally oriented bearing surfaces 33, preferably consisting of relatively thin ridges, both in width and in height, which radially extend from the piston body 34 at various positions around the circumference. The bearing surfaces 33 are the means which properly align the piston 30 within the valve bore 13. The height of the bearing surfaces 33 is such that the diameter of a circle created by the tops of the bearing surfaces 33 is only slightly smaller than the interior diameter of the valve bore 13. The number of bearing surfaces 33 is preferably limited to the number necessary to properly align the piston 30 within the valve bore 13 and provide sufficient contact to allow easy movement within the valve bore 13. It is important to create as little friction as possible between the bearing surfaces 33 and the valve bore 13, since any frictional resistance adds to the amount of total force required to close the valve. This friction is the major drawback in prior art valves which utilize O-rings to seal and align the piston. For this reason the overall longitudinal length of each of the bearing surfaces 33 is also preferably kept to the minimum necessary to maintain proper axial alignment. In the preferred embodiment, the bearing surfaces 33 may be provided at separate positions along the length of the piston body 34. As seen in FIGS. 2, 3 and 4, a first set of bearing surfaces 33 is mounted on the piston body beginning adjacent the slot 38 and a second set of bearing surfaces 33 is mounted around the annular cup seal flange 37 located centrally on the piston body 34. These bearing surfaces 33 preferably extend beyond the periphery of cup seal flange 37 so that cup seal flange 37 does not contact the valve bore 13.

It is necessary to seal the valve bore 13 so that no water flows past piston 30. Rather than utilize O-rings, which suffer from the drawbacks of creating excessive friction and which are relatively easily unseated by the water pressure, the invention utilizes an annular cup seal 70 made of a rubber, elastomer or other flexible polymeric material. The cup seal 70 comprises a circumferential seating flange 71 and a flared collar 72. The seating flange 71 is mounted within an annular recess 35 on the piston body 34 adjacent a circumferential cup seal flange 37 which extends radially outward from the piston body 34. The cup seal 70 is mounted such that the flared collar extends toward the inlet conduit 11. In this manner the pressure of the water flow pushes the flared collar 72 of the cup seal 70 radially outward against the valve bore 13 and longitudinally backward against the cup seal flange 37, thus creating a fluid-tight seal to prevent water from leaking out through the valve bore 13. When the piston 30 is moved axially outward relative to the valve body 10 to open the valve, the cup seal 70 provides very little frictional resistance, and the design of the cup seal 70 enables the water pressure to assist in moving the piston 30. When the piston is moved axially inward relative to the valve body 10 to close the valve, there is again relatively little frictional resistance, since only the outer edge of the flared collar 72 contacts the valve bore 13. The cup seal 70 remains positioned within the valve bore 13 over the full range of travel of piston 30.

A tip washer 50 is attached to the internal end 32 of piston 30. The tip washer 50 is the sealing means to stop the flow of water through the valve. While it is possible to attach the tip washer 50 with various methods, such as by adhesives, threaded screws or recesses formed by a circumferential collar, the preferred method of attachment is shown in the drawings. A mounting post 36 having a free end 41, preferably rounded, and a connected end 42 is joined to the flat internal end 32 of the piston main body 34 in coaxial alignment to longitudinal axis 1. the main piston body 34, bearing surfaces 33 and mounting post 36 are preferably molded from a single piece of plastic. The mounting post 36 is preferably tapered so as to diminish in cross-sectional diameter in the direction toward the connected end 42 and piston internal end 32. Tip washer 50, made of a rubber, elastomeric or flexible polymeric material, is provided with an axial aperture 51 which is sized to be slightly smaller in diameter than the largest diameter of the mounting post. In this manner, tip washer 50 may be forced onto mounting post 36 where it is securely held by the differential between diameters of the mounting post 36 and axial aperture 51.

The tip washer 50 is configured with a cylindrical portion 52 designed to abut the internal end 32 of piston 30 and a truncated cone portion 53 with a bevelled or chamfered surface 54 which faces the inlet orifice 21 and seat 22. The dimensions and angle of the chamfered surface 54 will vary in relationship to the size of the seat 22 of inlet orifice 21. Inlet orifice 21 is located at the end of inlet conduit 11. It is preferred that inlet orifice 21 be as large as possible so that there is little water flow restriction. As shown in the figures, inlet orifice 21 is almost as large in internal diameter as inlet conduit 12. Inlet orifice 21 comprises a seat 22 which abuts the tip washer 50 when piston 30 is advanced in such manner that water flow through the valve is completely stopped. Seat 22 may comprise a circumferential edge or corner, which may be bevelled or rounded, and which is sized to abut either the flat face of the tip washer 50 or the chamfered surface 54 of the tip washer 50. It is preferred that the seat 22 abut the chamfered surface 54. In the most preferred embodiment, the seat 22 is comprised of an annular lip or rim 23 which extends longitudinally toward the tip washer 50 and which is circumferentially bounded by a recessed channel 24. The annular rim 23 is preferably rounded and is sized to meet the chamfered surface 54 of the tip washer to form a 360 degree sealing junction when piston 30 is advanced toward inlet orifice 21.

The purpose of the recessed channel 24 is to provide a relatively large area for turbulent water flow when the valve is closed. As the chamfered surface 54 of the tip washer 50 nears the annular rim 23, the water pressure in inlet conduit 11 produces significant resistance to the complete closure of the valve. By providing recessed channel 24, the total overall area of restricted flow between the chamfered surface 54 and the seat 22 is significantly reduced. The area where high pressure is encountered during closure is limited to the very small area between the annular rim 23 and the contact line on the chamfered surface 54. As soon as the water flow passes this circumferential contact line, it encounters the recessed channel 24 and is able to expand, so that the resistance pressure against the tip washer 50 is significantly reduced.

It is contemplated that equivalents and substitutions for elements and components set forth above may be obvious to those skilled in the art. The true scope and definition of the invention therefore is to be as set forth in the following claims.

I claim:

1. In a plastic float valve comprising an inlet conduit to receive water from a water source conduit, an outlet conduit to provide water to a water delivery conduit, an inlet orifice connecting said inlet conduit and said outlet conduit within a valve body, a valve bore and a piston mounted within said valve bore which seals said inlet orifice by contacting a tip washer against a seat, the improvement comprising a plural number of longitudinally elongated, circumferentially spaced, thin bearing surface ridges mounted on and extending radially from said piston, said bearing surfaces being the only part of said piston which contacts said valve bore, an annular cup seal mounted on said piston to seal said valve bore, and where said seat of said inlet orifice comprises an annular rim which contacts said tip washer surrounded by a recessed channel.

2. The valve of claim 1, where said tip washer is comprised of a cylindrical portion adjacent said piston and a truncated cone portion adjacent said inlet orifice.

3. The valve of claim 2, where said tip washer is connected to said piston by providing an axial aperture in said tip washer and forcing said tip washer onto a mounting post extending from said piston, where said mounting post is tapered.

4. A plastic float valve comprising an inlet conduit and an outlet conduit connected by an inlet orifice, a piston mounted within a valve bore which seals said inlet orifice by pressing a tip washer mounted on the end of said piston against the seat of said inlet orifice, and a lever connected to a float, where said lever moves said piston within said valve bore in response to movement of said float, where said piston comprises a plural number of longitudinally oriented, circumferentially spaced, thin bearing surface ridges extending radially from said piston which contact said valve bore and properly align said piston within said valve bore, said bearing surfaces being thin ridges whereby there is a relatively small amount of contact between said bearing surfaces and said valve bore, said piston further comprising an annular cup seal mounted thereon to seal said valve bore, where said tip washer comprises a truncated cone portion which contacts said inlet conduit seat, and where said inlet conduit seat comprises an annular rim surrounded by a recessed channel.

5. The valve of claim 5, where said piston further comprises a tapered mounting post to retain said tip washer, and where said tip washer is provided with an axial aperture which receives said mounting post.

6. The valve of claim 4, where said annular rim contacts said truncated cone portion of said tip washer.

7. The valve of claim 2, where said annular rim contacts said truncated cone portion of said tip washer.

* * * * *